(12) United States Patent
Abe et al.

(10) Patent No.: US 9,097,509 B2
(45) Date of Patent: Aug. 4, 2015

(54) ROTATION ANGLE SENSOR (71) Applicant: JTEKT CORPORATION, Osaka-shi, Osaka (JP)

(72) Inventors: Kenichi Abe, Okazaki (JP); Tsutomu Matsumoto, Anjo (JP)

(73) Assignee: JTEKT CORPORATION, Osaka (JP)

( * ) Notice: Subject to any disclaimer, the term of this patent is extended or adjusted under 35 U.S.C. 154(b) by 79 days.

(21) Appl. No.: 13/911,228

(22) Filed: Jun. 6, 2013

(65) Prior Publication Data
US 2013/0335070 A1 Dec. 19, 2013

(30) Foreign Application Priority Data

Jun. 13, 2012 (JP) ................. 2012-133926

(51) Int. Cl.
| | |
|---|---|
| *G01B 7/14* | (2006.01) |
| *G01B 7/30* | (2006.01) |
| *G01D 5/14* | (2006.01) |
| *B62D 5/04* | (2006.01) |
| *G01D 5/244* | (2006.01) |

(52) U.S. Cl.
CPC *G01B 7/30* (2013.01); *B62D 5/049* (2013.01); *G01D 5/145* (2013.01); *G01D 5/24461* (2013.01)

(58) Field of Classification Search
CPC .......... G01B 7/30; G06F 19/00; B62D 5/049; B62D 15/0235
See application file for complete search history.

(56) References Cited

U.S. PATENT DOCUMENTS

| | | | |
|---|---|---|---|
| 7,304,452 B2 * | 12/2007 | Nagai et al. | 318/811 |
| 8,798,958 B2 * | 8/2014 | Satou et al. | 702/151 |
| 8,810,172 B2 * | 8/2014 | Kozawa et al. | 318/400.09 |
| 2011/0087456 A1 | 4/2011 | Satou et al. | |

* cited by examiner

*Primary Examiner* — Tung X Nguyen
(74) *Attorney, Agent, or Firm* — Oliff PLC (57) ABSTRACT

A rotation angle sensor outputs detection signals based on a rotation angle of a rotary shaft. The detection signals that are output from the rotation angle sensor include first to fourth detection signals that sinusoidally change with the rotation angle of the rotary shaft and that are different in phase from one another. Here, a phase difference between the first detection signal and the second detection signal and a phase difference between the third detection signal and the fourth detection signal are each set to 90°. In addition, a phase difference between the first detection signal and the third detection signal and a phase difference between the second detection signal and the fourth detection signal are each set to 45°.

4 Claims, 5 Drawing Sheets

FIRST DETECTION SIGNAL S1

Fig. 5A

SECOND DETECTION SIGNAL S2

Fig. 5B

THIRD DETECTION SIGNAL S3

Fig. 6A

FOURTH DETECTION SIGNAL S4

ROTATION ANGLE SENSOR

INCORPORATION BY REFERENCE/RELATED APPLICATION

This application claims priority to Japanese Patent Application No. 2012-133926 filed on Jun. 13, 2012 the disclosure of which, including the specification, drawings and abstract, is incorporated herein by reference in its entirety,

BACKGROUND OF THE INVENTION

1. Field of the Invention

The invention relates to a rotation angle sensor that detects a rotation angle of a rotary shaft.

2. Discussion of Background

US2011/0087456 A1 describes a device as a conventional rotation angle sensor of the above-described type. The rotation angle sensor includes two bridge circuits and a bias magnet. Each of the two bridge circuits is formed of four magnetoresistance elements. The bias magnet applies a bias magnetic field to each of the magnetoresistance elements of the two bridge circuits. The bias magnet rotates together with the rotary shaft. The direction of the bias magnetic field that is applied to each magnetoresistance element changes as the bias magnet rotates, and the resistance value of each magnetoresistance element changes. Thus, one of the bridge circuits outputs a signal $+\sin\theta$ that sinusoidally changes with respect to a rotation angle $\theta$ of the rotary shaft, and a signal $+\cos\theta$ that sinusoidally changes with respect to the rotation angle $\theta$. The other one of the bridge circuits outputs a signal $-\sin\theta$ that is shifted in phase by 180° with respect to the signal $+\sin\theta$, and a signal $-\cos\theta$ that is shifted in phase by 180° with respect to the signal $+\cos\theta$. Thus, if the detection signals output from the rotation angle sensor are acquired, and an arctangent is computed on the basis of the signal $+\sin\theta$ and the signal $+\cos\theta$ or an arctangent is computed on the basis of the signal $-\sin\theta$ and the signal $-\cos\theta$, it is possible to detect the rotation angle $\theta$ of the rotary shaft.

With the above-described configuration, for example, even if the signal $+\cos\theta$ from the one of the bridge circuits becomes abnormal, it is possible to compute the rotation angle $\theta$ by computing an arctangent on the basis of the signal $-\sin\theta$ and the signal $-\cos\theta$. In addition, even if the signal $-\sin\theta$ from the other one of the bridge circuits also becomes abnormal, it is possible to compute the rotation angle $\theta$ by reversing one of the sign of the remaining signal $+\sin\theta$ and the sign of the remaining signal $-\cos\theta$ and then computing an arctangent. Thus, it is possible to ensure the redundancy.

In the rotation angle sensor described in US2011/0087456 A1, if the signal $+\cos\theta$ from the one of the bridge circuits becomes abnormal and then the signal $-\cos\theta$ from the other one of the bridge circuits also becomes abnormal, normal signals are the signal $+\sin\theta$ and the signal $-\sin\theta$. However, it is not possible to compute an arctangent on the basis of these signals. Consequently, it is not possible to detect the rotation angle $\theta$ of the rotary shaft. That is, in the rotation angle sensor described in US2011/0087456 A1, if two of the four detection signals become abnormal and the remaining normal signals are only the signals of $\sin\theta$ or only the signals of $\cos\theta$, it is not possible to compute the rotation angle $\theta$.

SUMMARY OF THE INVENTION

The invention provides a rotation angle sensor that further improves the redundancy.

According to a feature of an example of the invention, in a rotation angle sensor that outputs detection signals corresponding to a rotation angle of a rotary shaft, the detection signals are first to fourth detection signals that sinusoidally change with respect to the rotation angle of the rotary shaft and that are different in phase from one another, and a phase difference $\phi$ between each predetermined pair of detection signals among the first to fourth detection signals falls within a range $0°<\phi<180°$ or a range $180°<\phi<360°$.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

An embodiment in which the invention is applied to a rotation angle sensor of an electric motor will be described below. First, the outline of a vehicle power steering system in which the rotation angle sensor according to the present embodiment is used will be described with reference to FIG. 1.

Figure 1:
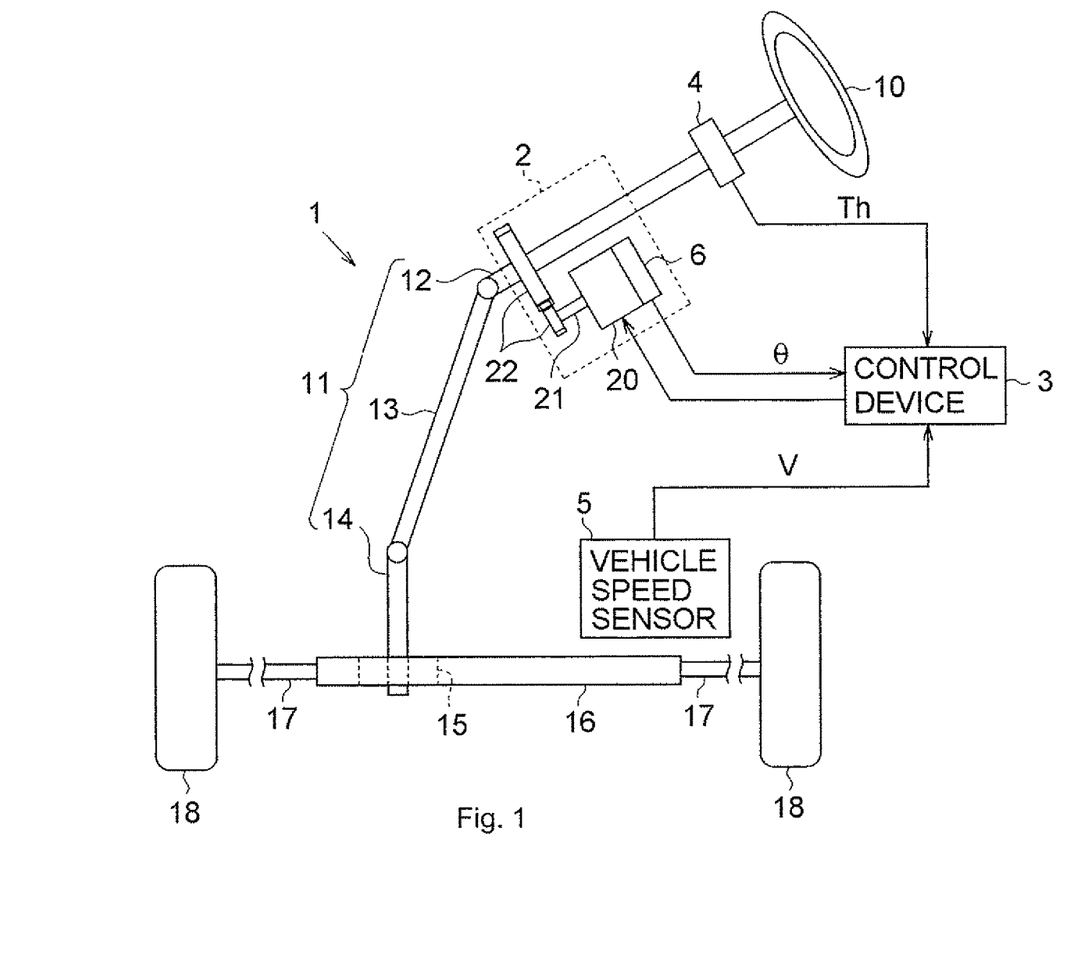
FIG. 1 is a block diagram that schematically shows the configuration of a vehicle power steering system.

As shown in FIG. 1, the power steering system includes a steering mechanism 1 and an assist mechanism 2. Steered wheels 18 are steered by the steering mechanism 1 on the basis of a driver's operation of a steering wheel 10. The assist mechanism 2 assists the driver's steering operation.

The steering mechanism 1 includes a steering shaft 11 that serves as a rotary shaft of the steering wheel 10. The steering shaft 11 is formed of a column shaft 12, an intermediate shaft 13, and a pinion shaft 14. The column shaft 12 is coupled to the center of the steering wheel 10. The intermediate shaft 13 is coupled to the lower end portion of the column shaft 12. The pinion shaft 14 is coupled to the lower end portion of the intermediate shaft 13. A rack shaft 16 is coupled to the lower end portion of the pinion shaft 14 via a rack-and-pinion mechanism 15. Thus, when the steering shaft 11 is rotated in response to a driver's steering operation, the rotary motion is converted into a reciprocating linear motion of the rack shaft 16 in the axial direction of the rack shaft 16 via the rack-and-pinion mechanism 15. The reciprocating linear motion of the rack shaft 16 is transmitted to the steered wheels 18 via tie rods 17 coupled to respective ends of the rack shaft 16. Thus, the steered angle of the steered wheels 18 changes, and the travelling direction of the vehicle is changed.

The assist mechanism 2 includes an electric motor 20 that applies assist torque to the column shaft 12. The rotation of a rotary shaft 21 of the electric motor 20 is transmitted to the column shaft 12 via a gear mechanism 22. Thus, motor torque is applied to the steering shaft 11, and a steering operation is assisted.

The power steering system includes various sensors that detect an operation amount of the steering wheel 10 and a vehicle state quantity. For example, a torque sensor 4 is provided on the column shaft 12. The torque sensor 4 detects a torque (steering torque) Th that is applied to the steering shaft 11 in response to a driver's steering operation. The vehicle includes a vehicle speed sensor 5 that detects a travelling speed V of the vehicle. The electric motor 20 is provided with a rotation angle sensor 6 that detects a rotation angle θ of the electric motor 20. Outputs from these sensors are input into a control device 3. The control device 3 sets a target assist torque on the basis of the outputs from the sensors, and executes feedback control of a current that is supplied to the electric motor 20 such that the assist torque that is applied from the electric motor 20 to the column shaft 12 becomes the target assist torque.

Figure 2:
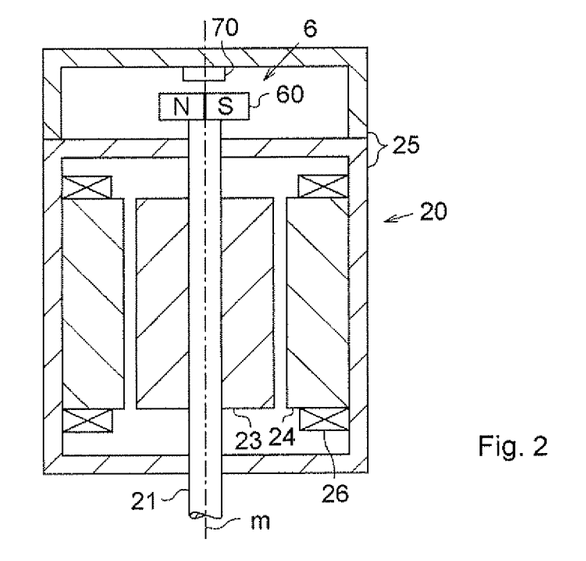
FIG. 2 is a sectional view that shows the sectional structure of an electric motor in which a rotation angle sensor according to an embodiment of the invention is installed.

Next, the structures of the electric motor 20 and the rotation angle sensor 6 will be described in detail with reference to FIG. 2 and FIG. 3. As shown in FIG. 2, the electric motor 20 includes a rotor 23 and a stator 24. The rotor 23 is fixed to the rotary shaft 21, and rotates together with the rotary shaft 21. The stator 24 is arranged so as to surround the rotor 23. The rotor 23 and the stator 24 are accommodated inside a housing 25. A permanent magnet is stuck onto the outer periphery of the rotor 23. The stator 24 is fixed to the inner wall of the housing 25. A plurality of protruding portions that protrude radially inward are formed on the inner periphery of the stator 24 so as to be arranged at predetermined angular intervals in the circumferential direction, and coils 26 are wound around the respective protruding portions. In the electric motor 20, the rotor 23 rotates together with the rotary shaft 21 due to rotating magnetic fields that are generated through energization of the coils 26.

The rotation angle sensor 6 includes a bias magnet 60 and an MR sensor 70. The bias magnet 60 is fixed to an end portion of the rotary shaft 21. The MR sensor 70 is fixed to the inner wall face of the housing 25 so as to face the bias magnet 60.

Figure 3:
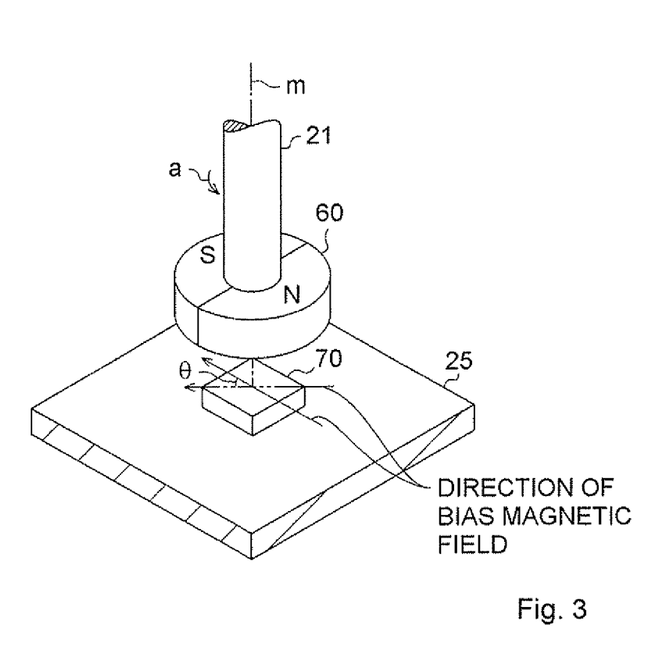
FIG. 3 is a perspective view that shows the perspective structure of the rotation angle sensor according to the embodiment.

As shown in FIG. 3, the bias magnet 60 is formed of a columnar two-pole magnet in which a north pole and a south pole are formed so as to be arranged in the circumferential direction. A bias magnetic field in a direction indicated by the solid-line arrow is applied to the MR sensor 70 by the bias magnet 60. For example, when the rotary shaft 21 is rotated by a predetermined angle θ in the direction indicated by an arrow a, from the position shown in the drawing, the bias magnet 60 is also rotated by the predetermined angle θ in the direction indicated by the arrow a. Thus, the direction of the bias magnetic field that is applied to the MR sensor 70 changes from the direction indicated by the solid-line arrow to a direction indicated by the long dashed double-short dashed line, by being rotated about an axis m by the predetermined angle θ. In this way, the direction of the magnetic field that is applied to the MR sensor 70 changes in accordance with the rotation angle θ of the rotary shaft 21.

Figure 4:
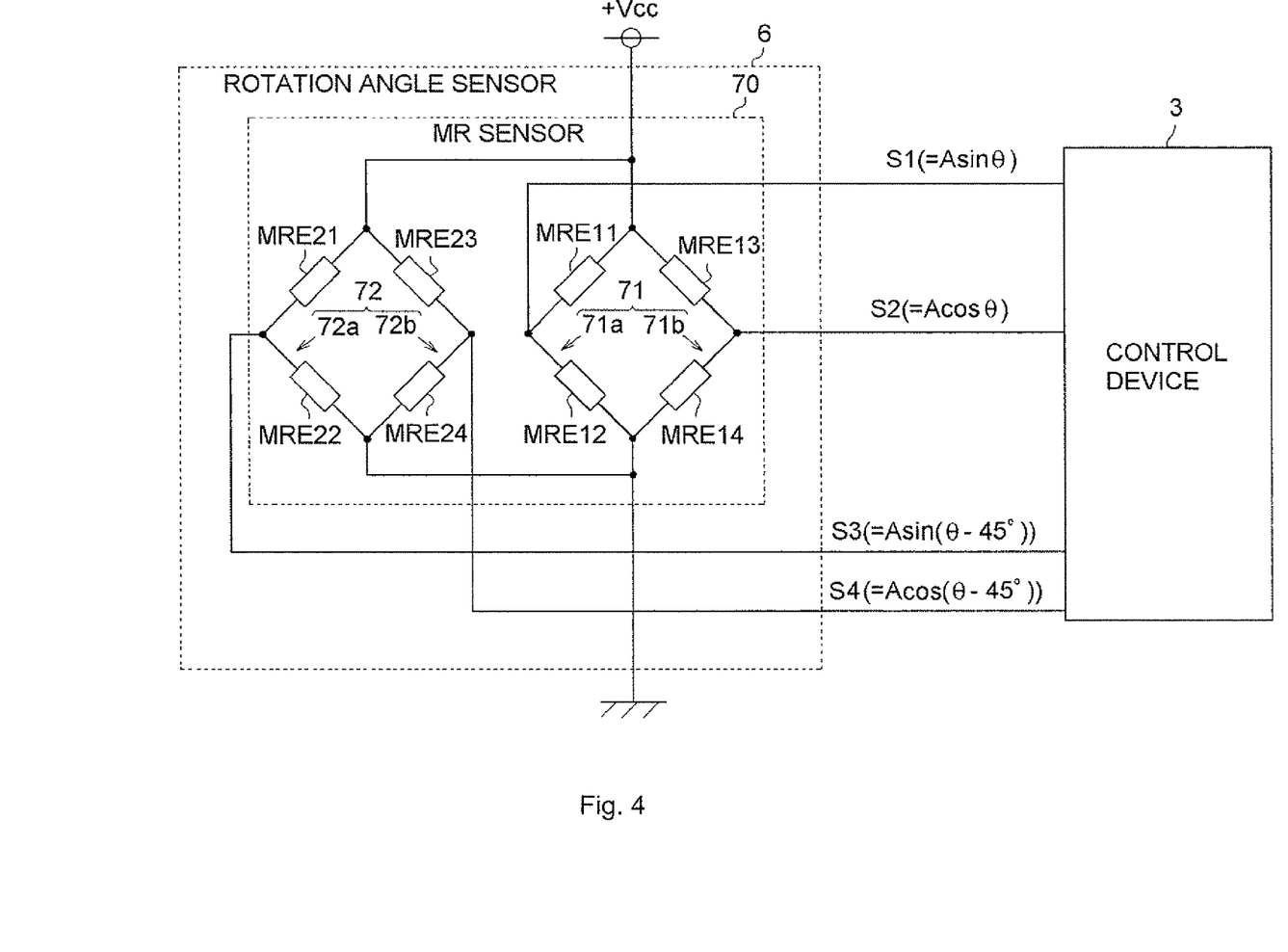
FIG. 4 is a circuit diagram that shows an equivalent circuit of the rotation angle sensor according to the embodiment.

The MR sensor 70 detects the direction of the bias magnetic field that is applied from the bias magnet 60, and outputs a detection signal based on the detected direction. As shown in FIG. 4, the MR sensor 70 includes a first bridge circuit 71 formed of four magnetoresistance elements MRE11 to MRE14 and a second bridge circuit 72 formed of four magnetoresistance elements MRE21 to MRE24.

The first bridge circuit 71 is formed of a half bridge circuit 71a in which the magnetoresistance elements MRE11, MRE12 are connected in series and a half bridge circuit 71b in which the magnetoresistance elements MRE13, MRE14 are connected in series. One end of each of the half bridge circuits 71a, 71b is connected to a power supply (power supply voltage "+Vcc"), and the other end of each of the half bridge circuits 71a, 71b is grounded. In the first bridge circuit 71, a midpoint potential between the magnetoresistance elements MRE11, MRE12 is output as a first detection signal S1, and a midpoint potential between the magnetoresistance elements MRE13, MRE14 is output as a second detection signal S2.

Figure 5A:
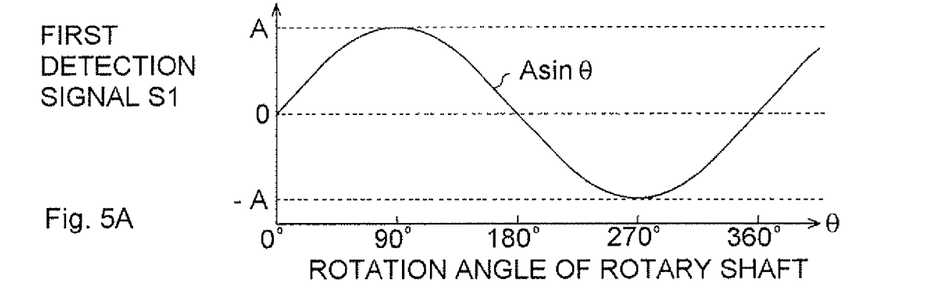
FIG. 5A is a graph that shows the correlation between a first detection signal that is output from a first bridge circuit and the rotation angle of a rotary shaft in the rotation angle sensor according to the embodiment.
Figure 5B:
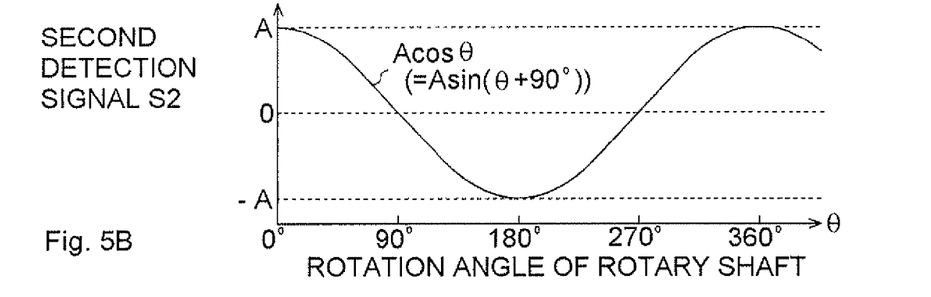
FIG. 5B is a graph that shows the correlation between a second detection signal that is output from the first bridge circuit and the rotation angle of the rotary shaft.

In the first bridge circuit 71, when the bias magnet 60 rotates in accordance with the rotation of the rotary shaft 21 and the direction of the bias magnetic field that is applied to the magnetoresistance elements MRE11 to MRE14 changes, the resistance values of the magnetoresistance elements MRE11 to MRE14 change. Due to the changes in these resistance values, the first detection signal S1 that is output from the half bridge circuit 71a and the second detection signal S2 that is output from the half bridge circuit 71b change. That is, the first detection signal S1 and the second detection signal S2 change in accordance with the rotation angle θ of the rotary shaft 21. FIG. 5A shows the correlation between the rotation angle θ of the rotary shaft 21, indicated by the abscissa axis, and the first detection signal S1 indicated by the ordinate axis. FIG. 5B shows the correlation between the rotation angle θ of the rotary shaft 21, indicated by the abscissa axis, and the second detection signal S2 indicated by the ordinate axis. As shown in FIG. 5A and FIG. 5B, both the first detection signal S1 and the second detection signal S2 are signals that sinusoidally change with respect to the rotation angle θ of the rotary shaft 21. In addition, in the present embodiment, by appropriately adjusting arrangement of the magnetoresistance elements MRE11 to MRE14, the second detection signal S2 is a signal that is advanced in phase by 90° with respect to the first detection signal S1. That is, the detection signals S1, S2 are expressed by the following mathematical expressions 1, 2, respectively. "A" denotes the amplitude of each of the detection signals S1, S2.

$$S1 = A\sin\theta \quad \text{Mathematical expression 1}$$

$$S2 = A\sin(\theta + 90°) \quad \text{Mathematical expression 2}$$
$$= A\cos\theta$$

As shown in FIG. 4, the second bridge circuit 72 has a circuit configuration similar to that of the first bridge circuit 71. That is, the second bridge circuit 72 is formed of a half bridge circuit 72a in which the magnetoresistance elements MRE21, MRE22 are connected in series and a half bridge circuit 72b in which the magnetoresistance elements MRE23, MRE24 are connected in series. One end of each of the half bridge circuits 72a, 72b is connected to the power supply, and the other end of each of the half bridge circuits 72a, 72b is grounded. In the second bridge circuit 72, a midpoint potential between the magnetoresistance elements MRE21, MRE22 is output as a third detection signal S3, and a midpoint potential between the magnetoresistance elements MRE23, MRE24 is output as a fourth detection signal S4.

Figure 6A:
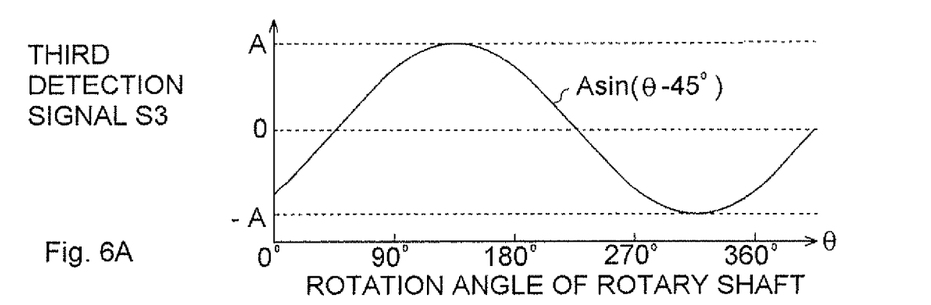
FIG. 6A is a graph that shows the correlation between a third detection signal that is output from a second bridge circuit and the rotation angle of the rotary shaft in the rotation angle sensor according to the embodiment.
Figure 6B:
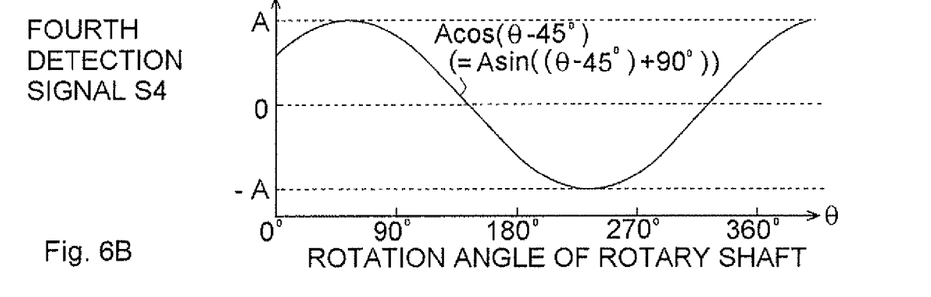
FIG. 6B is a graph that shows the correlation between a fourth detection signal that is output from the second bridge circuit and the rotation angle of the rotary shaft.

In the present embodiment, although not shown in the drawing, the second bridge circuit 72 is arranged so as to be shifted with respect to the first bridge circuit 71 by a predetermined angle in the rotation direction of the rotary shaft 21. Thus, as shown in FIG. 6A, the third detection signal S3 is a sine-wave signal that is delayed in phase by 45° with respect to the first detection signal S1. In addition, as shown in FIG. 6B, the fourth detection signal S4 is a sine-wave signal that is advanced in phase by 90° with respect to the third detection signal S3 and that is delayed in phase by 45° with respect to the second detection signal S2. That is, the detection signals S3, S4 are expressed by the following mathematical expressions 3, 4, respectively.

$$S3 = A\sin(\theta - 45°) \quad \text{Mathematical expression 3}$$

$$S4 = A\sin((\theta - 45°) + 90°) \quad \text{Mathematical expression 4}$$
$$= A\cos(\theta - 45°)$$

As shown in FIG. 4, the detection signals S1, S2 that are output from the first bridge circuit 71 and the detection signals S3, S4 that are output from the second bridge circuit 72 are input into the control device 3. The control device 3 detects the rotation angle θ of the rotary shaft 21 by computing an arctangent arctan θ on the basis of the first detection signal S1 and the second detection signal S2 or computing an arctangent) arctan(θ-45°) on the basis of the third detection signal S3 and the fourth detection signal S4. When any one of the four detection signals S1 to S4 is abnormal, the control device 3 computes the rotation angle θ of the rotary shaft 21 by utilizing the remaining normal detection signals. Hereinafter, the details of the computation of the rotation angle θ will be described together with the operation of the rotation angle sensor 6 according to the present embodiment.

The following description will be provided on the assumption that, for example, an abnormality has occurred in the first bridge circuit 71 and any one of the first detection signal S1 and the second detection signal S2 is abnormal or both of them are abnormal. In this case, the control device 3 detects the rotation angle θ of the rotary shaft 21 by computing an arctangent)arctan(θ−45°) on the basis of the third detection signal S3 and the fourth detection signal S4 and then adding 45° to the computed arctangent) arctan(θ−45°). Similarly, when any one of the third detection signal S3 and fourth detection signal S4 of the second bridge circuit 72 is abnormal or both of them are abnormal, the control device 3 detects the rotation angle θ of the rotary shaft 21 by computing an arctangent arctan θ on the basis of the first detection signal S1 and the second detection signal S2.

Figure 7:
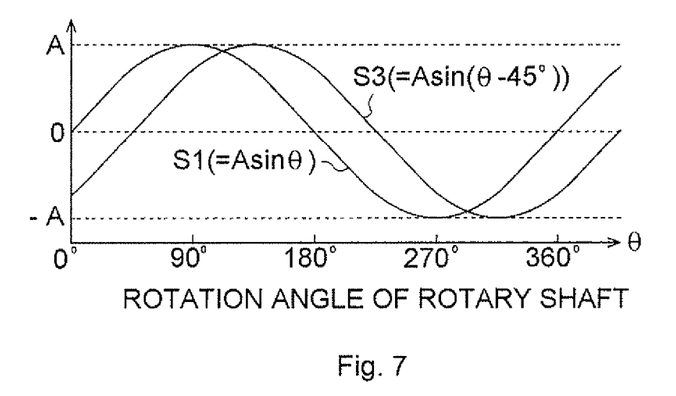
FIG. 7 is a graph that shows normal detection signals that are input into a control device when the second detection signal and the fourth detection signal are abnormal in the rotation angle sensor according to the embodiment.

The following description will be provided on the assumption that the second detection signal S2 and the fourth detection signal S4 are abnormal. In this case, normal signals that are input into the control device 3 are the first detection signal S1 and the third detection signal S3. However, because the first detection signal S1 and the third detection signal S3 are both sine-wave signals as shown in FIG. 7, it is not possible to directly compute an arctangent from those signals. Therefore, the control device 3 according to the present embodiment computes a normal value of the second detection signal S2, that is, the normal cosine value A cos θ, by utilizing the first detection signal S1 and the third detection signal S3. More specifically, the above-described mathematical expression 3 may be modified as follows using trigonometric function formulas and the above-described mathematical expression 1.

$$S3 = A\sin(\theta - 45°)$$
$$= A(\sin\theta\cos45° - \cos\theta\sin45°)$$
$$= A(\sin\theta - \cos\theta)/\sqrt{2}$$
$$= (S1 - A\cos\theta)/\sqrt{2}$$

Thus, the cosine value A cos θ is computed according to the following mathematical expression 5.

$$A\cos\theta = S1 - \sqrt{2} \times S3 \quad \text{Mathematical expression 5}$$

Here, the control device 3 computes the cosine value A cos θ from the values of the normal first detection signal S1 and third detection signal S3, according to the mathematical expression 5. The rotation angle θ of the rotary shaft 21 is detected by computing the arctangent arctan θ on the basis of the computed cosine value A cos θ and the value of the first detection signal S1 (=A sin θ). Similarly, when the first detection signal S1 and the third detection signal S3 are abnormal, the control device 3 computes the value of the first detection signal S1, that is, the sine value A sin θ, from the normal second detection signal S2 and fourth detection signal S4. The rotation angle θ of the rotary shaft 21 is computed by computing the arctangent arctan θ on the basis of the computed sine value A sin θ and the value of the second detection signal S2 (=A cos θ).

Figure 8:
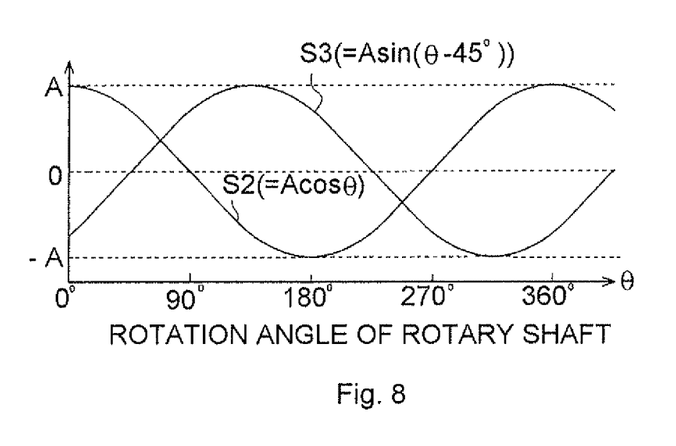
FIG. 8 is a graph that shows normal detection signals that are input into the control device when the first detection signal and the fourth detection signals are abnormal in the rotation angle sensor according to the embodiment.

The following description will be provided on the assumption that, for example, the first detection signal S1 and the fourth detection signal S4 are abnormal. In this case, normal signals that are input into the control device 3 are the second detection signal S2 and the third detection signal S3. As shown in FIG. 8, although the second detection signal S2 and the third detection signal S3 are a cosine-wave signal and a sine-wave signal, respectively, these signals have a phase difference. Therefore, it is not possible to directly compute an arctangent from these signals. Therefore, the control device 3 according to the present embodiment computes a normal value of the first detection signal S1, that is, the normal sine value A sin θ, on the basis of the second detection signal S2 and the third detection signal S3. More specifically, the above-described mathematical expression 3 may be modified as follows using trigonometric function formulas and the above-described mathematical expression 1.

$$S3 = A\sin(\theta - 45°)$$
$$= A(\sin\theta\cos 45° - \cos\theta\sin 45°)$$
$$= A(\sin\theta - \cos\theta)/\sqrt{2}$$
$$= (A\sin\theta - S2)/\sqrt{2}$$

Thus, the sine value $A \sin \theta$ is computed by the following mathematical expression 6.

$$A \sin \theta = S2 + \sqrt{2} \times S3 \qquad \text{Mathematical expression 6}$$

The control device 3 computes the sine value $A \sin \theta 0$ from the values of the normal second detection signal S2 and third detection signal S3 according to the mathematical expression 6. Then, the rotation angle $\theta$ of the rotary shaft 21 is detected by computing an arctangent on the basis of the computed sine value $A \sin \theta$ and the value of the second detection signal S2 (=$A \cos \theta$). Similarly, when the second detection signal S2 and the third detection signal S3 are abnormal, the control device 3 computes a normal value of the second detection signal S2, that is, the normal cosine value $A \cos \theta$, from the normal first detection signal S1 and fourth detection signal S4. Then, the rotation angle $\theta$ of the rotary shaft 21 is detected by computing the arctangent arctan $\theta$ on the basis of the computed cosine value $A \cos \theta$ and the value of the first detection signal S1 (=$A \sin \theta$).

As described above, with the rotation angle sensor 6 according to the present embodiment, even when any one of the four detected values S1 to S4 is abnormal, it is possible to compute the rotation angle $\theta$ of the rotary shaft 21. Even when any two of the four detection signals S1 to S4 are abnormal, it is possible to compute the rotation angle $\theta$ of the rotary shaft 21. Thus, the redundancy improves.

As described above, with the rotation angle sensor according to the present embodiment, the following advantageous effects are obtained.

(1) The rotation angle sensor 6 outputs the four detection signals S1 to S4 that sinusoidaily change with respect to the rotation angle $\theta$ of the rotary shaft 21 and that are different in phase from one another. The phase difference between the first detection signal S1 and the second detection signal S2 and the phase difference between the third detection signal S3 and the fourth detection signal S4 are each set to 90°. Thus, the redundancy further improves.

(2) The phase difference between the first detection signal S1 and the third detection signal S3 and the phase difference between the second detection signal S2 and the fourth detection signal S4 are each set to 45°. Thus, it is possible to reduce the amount of computation at the time when the normal value of the second detection signal S2 is computed on the basis of the first detection signal S1 and the third detection signal S3 or the amount of computation at the time when the normal value of the first detection signal S1 is computed on the basis of the second detection signal S2 and the third detection signal S3. Thus, the speed of computation of the rotation angle $\theta$ improves.

(3) The MR sensor 70 includes the first bridge circuit 71 and the second bridge circuit 72 in each of which the four magnetoresistance elements are bridge-connected with each other. The first detection signal S1 and the second detection signal S2 are output from the respective midpoints of the two half bridge circuits 71a, 71b that constitute the first bridge circuit 71. The third detection signal S3 and the fourth detection signal S4 are output from the respective midpoints of the two half bridge circuits 72a, 72b that constitute the second bridge circuit 72. Furthermore, the second bridge circuit 72 is arranged so as to be shifted with respect to the first bridge circuit 71 by the predetermined angle in the rotation direction of the rotary shaft 21. Thus, just by arranging the first bridge circuit 71 and the second bridge circuit 72 such that they are shifted from each other by the predetermined angle in the rotation direction of the rotary shaft 21 during manufacturing of the rotation angle sensor 6, it is possible to set each of the phase difference between the first detection signal S1 and the third detection signal S3 and the phase difference between the second detection signal S2 and the fourth detection signal S4 to 45°. Thus, manufacturing of the rotation angle sensor 6 is facilitated.

The above-described embodiment may be modified into the following alternative embodiments as needed.

In the above-described embodiment, the MR sensor 70 is used as the magnetic sensor that detects a change in the bias magnetic field. Alternatively, for example, a Hall sensor, or the like, may be used. In short, any type of magnetic sensor may be used as long as the magnetic sensor senses a change in the bias magnetic field during rotation of the rotary shaft 21 and outputs the four detection signals S1 to S4.

In the above-described embodiment, the rotation angle sensor 6 formed of the bias magnet 60 and the MR sensor 70 is used. However, the structure of the rotation angle sensor 6 is not particularly limited. For example, a resolver, or the like, may be used as the rotation angle sensor 6. Any type of rotation angle sensor may be used as the rotation angle sensor 6, as long as the rotation angle sensor outputs the four detection signals S1 to S4 corresponding to the rotation angle $\theta$ of the rotary shaft 21.

In the above-described embodiment, the phase difference between the first detection signal S1 and the third detection signal S3 and the phase difference between the second detection signal S2 and the fourth detection signal S4 are each set to 45°. Alternatively, the phase differences may be set to any one of 135°, 225° and 315°. Even when the phase differences are set in this way, an advantageous effect similar to the above-described advantageous effect (2) is obtained.

In the above-described embodiment and its alternative embodiment, the phase difference between the first detection signal S1 and the third detection signal S3 and the phase difference between the second detection signal S2 and the fourth detection signal S4 are each set to any one of 45°, 135°, 225° and 315°. However, the phase differences are not limited to these values, and may be changed as needed. At this time, the phase difference between the first detection signal S1 and the third detection signal S3 and the phase difference between the second detection signal S2 and the fourth detection signal S4 may be set to different values. In addition, in the above-described embodiment, the phase difference between the first detection signal S1 and the second detection signal. S2 and the phase difference between the third detection signal S3 and the fourth detection signal S4 are each set to 90°. However, the phase differences are not limited to these values, and may be changed as needed. At this time, the phase difference between the first detection signal S1 and the second detection signal S2 and the phase difference between the third detection signal S3 and the fourth detection signal S4 may be set to different values. In short, it is necessary that the phases of the first to fourth detection signals S1 to S4 should be different from one another and the phase difference $\phi$ between each predetermined pair of detection signals among the first to fourth detection signals S1 to S4 should fall within the range $0° < \phi < 180°$ or the range $180° < \phi < 360°$. If the phase difference $\phi$ between each predetermined pair of detection signals among the first to fourth detection signals S1 to S4 is set in this way, when any one of the first to fourth detection signals becomes abnormal, it is possible to compute an arctangent by performing computation according to the above-described mathematical expressions 5, 6, on the basis of the remaining normal three detection signals. Thus, it is possible to detect the rotation angle θ of the rotary shaft 21. In addition, even when any one of the remaining three detection signals also becomes abnormal, it is possible to compute an arctangent by performing computation according to the above-described mathematical expressions 5, 6, on the basis of the remaining two normal detection signals. Thus, it is possible to detect the rotation angle θ of the rotary shaft 21.

In the above-described embodiment, the invention is applied to the rotation angle sensor 6 that detects the rotation angle θ of the rotary shaft 21 of the electric motor 20. Alternatively, the invention may be applied to any rotation angle sensors such as a rotation angle sensor that detects the rotation angle of a steering shaft. That is, a rotary shaft of which the rotation angle is detected by the rotation angle sensor is not particularly limited. In short, the invention may be applied to any rotation angle sensor as long as the rotation angle sensor outputs detection signals corresponding to the rotation angle of a rotary shaft.

What is claimed is:

1. A rotation angle sensor, wherein:
   the rotation angle sensor outputs detection signals corresponding to a rotation angle of a rotary shaft;
   the detection signals are first to fourth detection signals that sinusoidally change with respect to the rotation angle of the rotary shaft and that are different in phase from one another; and
   a phase difference φ between each predetermined pair of detection signals among the first to fourth detection signals falls within a range 0°<φ<180° or a range 180°<φ<360°.

2. The rotation angle sensor according to claim 1, wherein the phase difference between the first detection signal and the second detection signal and the phase difference between the third detection signal and the fourth detection signal are each set to 90°.

3. The rotation angle sensor according to claim 2, wherein:
   the phase difference between the first detection signal and the third detection signal and the phase difference between the second detection signal and the fourth detection signal are set to the same predetermined value; and
   the predetermined value is set to any one of 45°, 135°, 225° and 315°.

4. The rotation angle sensor according to claim 3, comprising:
   a magnetic sensor; and
   a bias magnet that applies a bias magnetic field to the magnetic sensor and that rotates together with the rotary shaft, wherein
   the magnetic sensor includes a first bridge circuit and a second bridge circuit in each of which four magnetoresistance elements are bridge-connected with each other, senses a change in the bias magnetic field, which occurs during rotation of the rotary shaft, with use of the first bridge circuit and the second bridge circuit, outputs the first detection signal and the second detection signal from midpoints of respective two half bridge circuits that constitute the first bridge circuit, and outputs the third detection signal and the fourth detection signal from midpoints of respective two half bridge circuits that constitute the second bridge circuit, and
   the second bridge circuit is arranged so as to be shifted with respect to the first bridge circuit by a predetermined angle in a rotation direction of the rotary shaft.

* * * * *